No. 831,116. PATENTED SEPT. 18, 1906.
D. F. STAYMAN.
MEANS FOR ADJUSTABLY SECURING PULLEYS TO SHAFTING.
APPLICATION FILED DEC. 7, 1905.
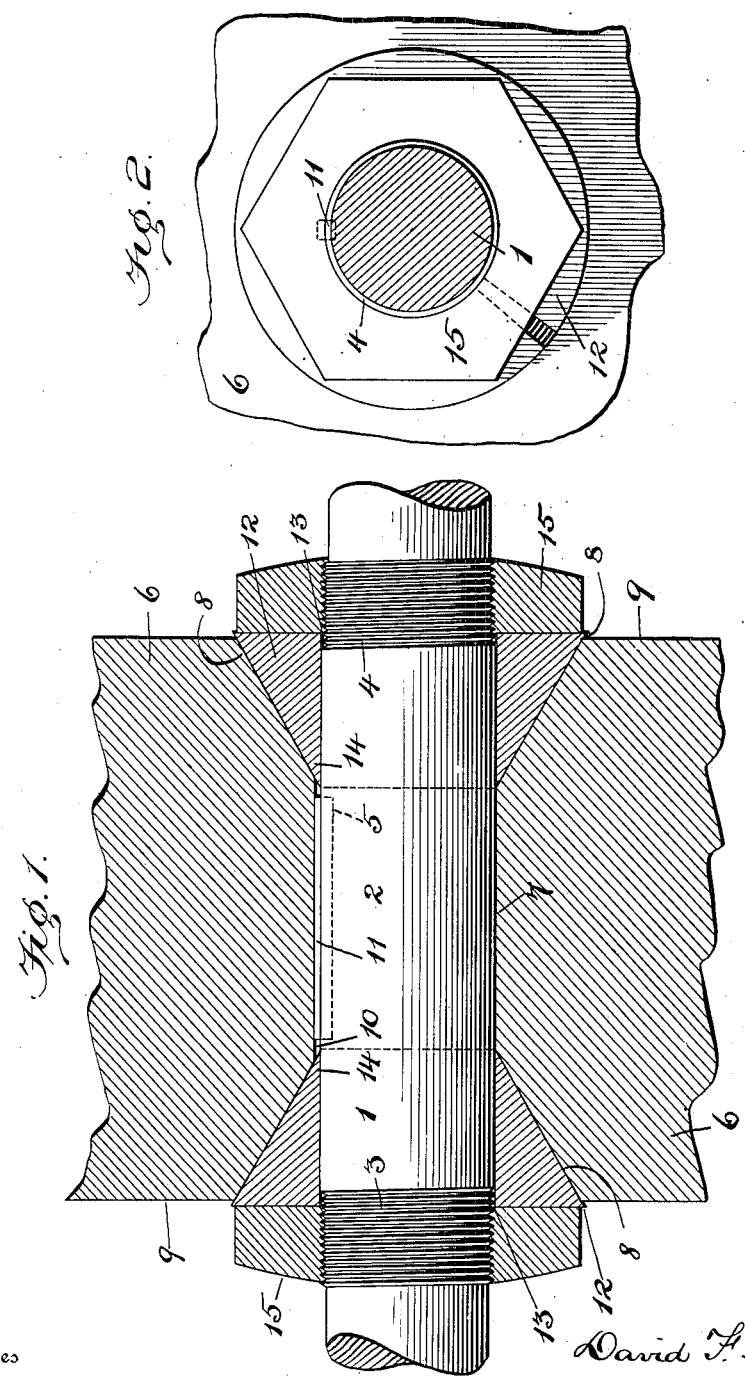

UNITED STATES PATENT OFFICE

DAVID FOUST STAYMAN, OF BALTIMORE, MARYLAND.

MEANS FOR ADJUSTABLY SECURING PULLEYS TO SHAFTING.

No. 831,116.   Specification of Letters Patent.   Patented Sept. 18, 1906.

Application filed December 7, 1905. Serial No. 290,717.

*To all whom it may concern:*

Be it known that I, DAVID FOUST STAYMAN, a citizen of the United States, residing at Baltimore, in the State of Maryland, have invented certain new and useful Improvements in Means for Adjustably Securing Pulleys or other Rotating Bodies to Shafting, of which the following is a specification.

My invention relates to improvements in means for adjustably securing pulleys, armatures, and other rotating bodies to shafting.

The object of the invention is to provide an improved construction of device that will enable pulleys and other rotating bodies to be accurately mounted on shafting so that said bodies may be revolved in a true circular path with respect to said shaft.

The invention is illustrated in the accompanying drawings, in which—

Figure 1 shows a cross-sectional elevation through a pulley or other body which is secured to a shaft by my improved devices, and Fig. 2 is an end elevation of the same.

Referring to the drawings by numerals, 1 designates a shaft which is provided with a smooth portion 2 and having screw-threaded portions 3 and 4 at opposite ends of said smooth portion. Said shaft is also provided with a groove or key-seat 5, which extends longitudinally therein between said threaded portions.

The pulley or other rotating body 6 has a width substantially equal to the smooth portion 2 of the shaft, and said pulley has an opening or bore 7, through which the shaft extends freely. At opposite sides and around the opening or bore the pulley is provided with cone-shaped openings 8, which extend from the outer surface 9 of the pulley, where they are of the largest diameter, toward a point adjacent the smooth portion of the shaft where their diameters are smallest.

A key-seat 10 is also provided in the pulley or other body which extends crosswise therebetween the cone-shaped openings 8, and a key 11 fits in the seats 5 and 10 and locks the pulley and shaft in rotary engagement. While the pulley or other body is thus locked in rotary engagement with the shaft, it yet remains to provide means whereby the pulley may be properly adjusted or set on the shaft, so that the pulley will revolve in a true circular path without wabble, and in order to make this adjustment quickly and accurately I provide a split-cone bushing 12, having a central opening 13 to fit snugly around the shaft with its smaller or point end 14 innermost and entering the cone-shaped opening 8 in the side of the pulley. Of course two bushings are employed. A nut 15 is then slipped on the shaft, one at each side of the pulley, and these engage with the threaded portions 3 and 4 of the shaft, and by then turning the nuts the cone-bushings will be driven into the side openings 8 of the pulley. By tightening the nut at one side of the pulley and loosening the nut at the opposite side the most delicate adjustment of the pulley on the shaft may be obtained.

Having thus described my invention, what I claim as new, and desire to secure by Letters Patent, is—

In a device of the character described the combination of a shaft provided with a smooth portion and with screw-threaded portions at opposite ends of said smooth portion, and having a key-seat in the smooth portion between said threaded portions; a pulley or body on said shaft and having a central opening with a key-seat therein and also having a cone-shaped opening at each side of the key-seat; a key in said two key-seats; a cone-bushing in each of said side openings, and nuts engaging the threads on the shaft and pressing against the bushings for forcing the latter into said cone-openings.

In testimony whereof I affix my signature in presence of two witnesses.

DAVID FOUST STAYMAN.

Witnesses:
 EDWARD P. GILCHRIST,
 ELISABETH M. WYNKOOP.